(12) United States Patent
Pounds et al.

(10) Patent No.: US 10,922,319 B2
(45) Date of Patent: Feb. 16, 2021

(54) CONSISTENCY MITIGATION TECHNIQUES FOR REAL-TIME STREAMS

(71) Applicant: eBay Inc., San Jose, CA (US)

(72) Inventors: Jennica Jane Pounds, Bellevue, WA (US); Aidan Rogers, San Jose, CA (US); Stanislav Pugach, San Jose, CA (US); Kang Liu, Shanghai (CN)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 15/781,922

(22) PCT Filed: Apr. 19, 2017

(86) PCT No.: PCT/CN2017/081048
§ 371 (c)(1),
(2) Date: Jun. 6, 2018

(87) PCT Pub. No.: WO2018/191879
PCT Pub. Date: Oct. 25, 2018

(65) Prior Publication Data
US 2020/0257693 A1 Aug. 13, 2020

(51) Int. Cl.
*G06F 16/00* (2019.01)
*G06F 16/2455* (2019.01)
(Continued)

(52) U.S. Cl.
CPC ........ *G06F 16/24568* (2019.01); *G06F 9/546* (2013.01); *G06F 16/128* (2019.01); *G06F 16/2322* (2019.01); *G06F 16/2477* (2019.01)

(58) Field of Classification Search
CPC .......... G06F 16/24568; G06F 16/2477; G06F 16/2322; G06F 16/128; G06F 16/00;
(Continued)

(56) References Cited

U.S. PATENT DOCUMENTS 7,631,097 B2   12/2009   Moch et al.
8,046,780 B1 * 10/2011   Alcock ............... G06F 9/52
                                                    719/330
(Continued)

FOREIGN PATENT DOCUMENTS

CN   104267874 A   1/2015
CN   105379183 A   3/2016
(Continued)

OTHER PUBLICATIONS

"Twitter Snowflake Developer Tool", Retrieved from the Internet URL : <https://dev.twitter.com/overview/api/twitter-ids-son-and-snowflake>, Mar. 2, 2017, 2 pages.
(Continued)

*Primary Examiner* — Anh Ly
(74) *Attorney, Agent, or Firm* — Fig. 1 Patents

(57) ABSTRACT

Aspects of the present disclosure include a system comprising a machine-readable storage medium storing instructions and computer-implemented methods for consistency mitigation in real-time streams. Consistent with some embodiments, the method includes reading a message object from a message queue and adding the message object to an aggregating cache. The aggregating cache includes a linked list of ordered message objects. The method further includes applying an aggregating function to the message objects in the linked list and persisting the aggregated message objects to a database. The method further includes clearing the message objects from the aggregating cache based on the message objects being persisted to the database.

20 Claims, 10 Drawing Sheets

(51) Int. Cl.
*G06F 16/2458* (2019.01)
*G06F 16/23* (2019.01)
*G06F 16/11* (2019.01)
*G06F 9/54* (2006.01)

(58) Field of Classification Search
CPC .......... G06F 17/00; G06F 17/30; G06F 9/546; G06F 11/14; G06F 11/16; G06F 16/258; G06F 11/1471; G06F 11/1438; G06F 11/2048; G06F 9/5083; G06F 2201/84; G06F 40/169; G06F 11/34; G06Q 30/00; H04L 67/22; H04L 43/00; H04L 67/12; H04L 67/26; H04L 12/1859
See application file for complete search history.

(56) References Cited

U.S. PATENT DOCUMENTS

| | | | |
|---|---|---|---|
| 8,145,859 | B2 | 3/2012 | Park et al. |
| 8,352,517 | B2 | 1/2013 | Park et al. |
| 8,683,262 | B1 | 3/2014 | Subbiah et al. |
| 8,738,723 | B1 | 5/2014 | Faaborg et al. |
| 8,745,164 | B2 | 6/2014 | Choi et al. |
| 8,972,637 | B1* | 3/2015 | Hushon, Jr. ........... G06F 3/0689 710/74 |
| 10,691,485 | B2 | 6/2020 | Pounds et al. |
| 2005/0022213 | A1* | 1/2005 | Yamagami .......... G06F 11/1471 719/328 |
| 2006/0230072 | A1 | 10/2006 | Partovi et al. |
| 2007/0124116 | A1 | 5/2007 | Liu et al. |
| 2007/0233724 | A1 | 10/2007 | Kyoya |
| 2007/0239630 | A1 | 10/2007 | Davis et al. |
| 2009/0182798 | A1 | 7/2009 | Chang et al. |
| 2010/0188412 | A1 | 7/2010 | Li et al. |
| 2011/0154297 | A1 | 6/2011 | Singh et al. |
| 2011/0307540 | A1 | 12/2011 | Martin |
| 2012/0017063 | A1 | 1/2012 | Hummel et al. |
| 2012/0076152 | A1 | 3/2012 | Mansharamani |
| 2012/0240019 | A1 | 9/2012 | Nuzzi |
| 2012/0290947 | A1 | 11/2012 | Baggett et al. |
| 2013/0036427 | A1* | 2/2013 | Chen ................... G06F 9/546 719/312 |
| 2013/0103654 | A1 | 4/2013 | Mclachlan et al. |
| 2013/0166522 | A1* | 6/2013 | Kaufmann .......... G06F 16/2477 707/695 |
| 2013/0311506 | A1 | 11/2013 | Taubman et al. |
| 2014/0089265 | A1* | 3/2014 | Talagala ............... G06F 16/22 707/674 |
| 2014/0181888 | A1 | 6/2014 | Li et al. |
| 2014/0304545 | A1* | 10/2014 | Chen ..................... G06F 9/46 714/4.3 |
| 2015/0006485 | A1 | 1/2015 | Christiansen |
| 2015/0039648 | A1 | 2/2015 | Mukherjee et al. |
| 2015/0055778 | A1 | 2/2015 | Cox et al. |
| 2015/0077335 | A1 | 3/2015 | Taguchi et al. |
| 2015/0121524 | A1 | 4/2015 | Fawaz et al. |
| 2015/0143343 | A1 | 5/2015 | Weiss et al. |
| 2015/0163188 | A1 | 6/2015 | Faaborg et al. |
| 2015/0186217 | A1* | 7/2015 | Eslami Sarab ..... G06F 11/1435 707/649 |
| 2015/0207705 | A1 | 7/2015 | Piercey |
| 2015/0256423 | A1 | 9/2015 | Stearns |
| 2015/0286695 | A1* | 10/2015 | Kadayam ................ G06F 11/10 707/639 |
| 2015/0378938 | A1 | 12/2015 | Lyman |
| 2016/0011984 | A1 | 1/2016 | Speer et al. |
| 2016/0043978 | A1* | 2/2016 | Jenkins ................... H04L 51/24 709/206 |
| 2016/0085809 | A1 | 3/2016 | De Castro et al. |
| 2016/0085810 | A1 | 3/2016 | de Castro Alves et al. |
| 2016/0094944 | A1 | 3/2016 | Kong et al. |
| 2016/0103757 | A1 | 4/2016 | Liu et al. |
| 2016/0179799 | A1 | 6/2016 | Raman et al. |
| 2016/0182328 | A1* | 6/2016 | Bhasin .................. H04L 43/067 709/224 |
| 2016/0203061 | A1 | 7/2016 | Lee et al. |
| 2016/0219089 | A1 | 7/2016 | Murthy et al. |
| 2016/0277419 | A1 | 9/2016 | Allen et al. |
| 2017/0024912 | A1 | 1/2017 | De Castro et al. |
| 2017/0039242 | A1 | 2/2017 | Milton et al. |
| 2017/0083380 | A1* | 3/2017 | Bishop .................. G06F 9/5083 |
| 2017/0286281 | A1 | 10/2017 | Dahan |
| 2018/0197297 | A1* | 7/2018 | Jia ........................ G06F 16/5838 |
| 2019/0250944 | A1 | 8/2019 | Pounds et al. |

FOREIGN PATENT DOCUMENTS

| | | |
|---|---|---|
| CN | 105593854 A | 5/2016 |
| EP | 2921975 A1 | 9/2015 |
| WO | 2018/191879 A1 | 10/2018 |

OTHER PUBLICATIONS

Kim et al., "NVWAL: Exploiting NVRAM in Write-Ahead Logging", ASPLOS'16, 2016, pp. 385-398.
International Search Report received for PCT Patent Application No. PCT/CN2017/081048, dated Jan. 19, 2018, 4 pages.
Written Opinion received for PCT Patent Application No. PCT/CN2017/081048, dated Jan. 19, 2018, 3 pages.
U.S. Appl. No. 15/895,850, filed Feb. 13, 2018, Availability Oriented Durability Technique for Distributed Server Systems.
Notice of Allowance received for U.S. Appl. No. 15/895,850, dated Dec. 3, 2019, 10 pages.
International Preliminary report on Patentability received for PCT Patent Application No. PCT/CN2017/081048, dated Oct. 31, 2019, 5 pages.
Pounds et al., "Availability oriented durability technique for high-traffic HTTP servers", Jul. 28, 2017, 32 pages.
Pounds et al., "Technique for consistency mitigation in real-time streams for high-update data ingest", Jul. 28, 2017, 11 pages.
Wikipedia, "ACID in databases", retrieved from the Internet URL— https://en.wikipedia.org/wiki/ACID, Dec. 19, 2019, 5 pages.
Wikipedia, "CAP Theorem", retrieved from the Internal URL— https://en.wikipedia.org/wiki/CAP_theorem, Dec. 25, 2019, 4 pages.
Wikipedia, "Write-ahead logging", retrieved from the Internet URL— https://en.wikipedia.org/wiki/Write-ahead_logging, Dec. 9, 2019, 1 page.
Notice of Allowance received for U.S. Appl. No. 15/895,850, dated Apr. 30, 2020, 10 pages.

* cited by examiner

CONSISTENCY MITIGATION TECHNIQUES FOR REAL-TIME STREAMS

TECHNICAL FIELD

The present disclosure generally relates to the technical field of special-purpose machines that process real-time data streams, including computerized variants of such special-purpose machines and improvements to such variants, and to the technologies by which such special-purpose machines become improved compared to other special-purpose machines that process real-time data streams. In particular, the present disclosure addresses systems and methods for handling out-of-order and duplicated events for high update database write scenarios.

BACKGROUND

Typically, a message queue layer functions as an intermediary between real-time streaming data sources and software systems that process the streaming data. For the streaming data, the senders represent a source, such as incoming event data, and the receivers represent their downstream consumers that process the event data, such as Apache Storm or Spark. Some conventional message queues (e.g., RabbitMQ) include features that track what consumer has received which message with acknowledgements. Other conventional queues (e.g., Apache Kafka) defer the tracking to the receiver layer.

A general concern with respect to scalability is that the more consensus that needs to be performed, the more the rest of the system will needlessly wait while that synchronization is being performed. Thus, a tradeoff between reliability/consistency and performance can be realized. In a scalable system, consumers who require a higher standard of consistency than a message queue can provide may need to be able to handle out-of-order messages and duplicated messages (duplication is often a side effect of guaranteed delivery).

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
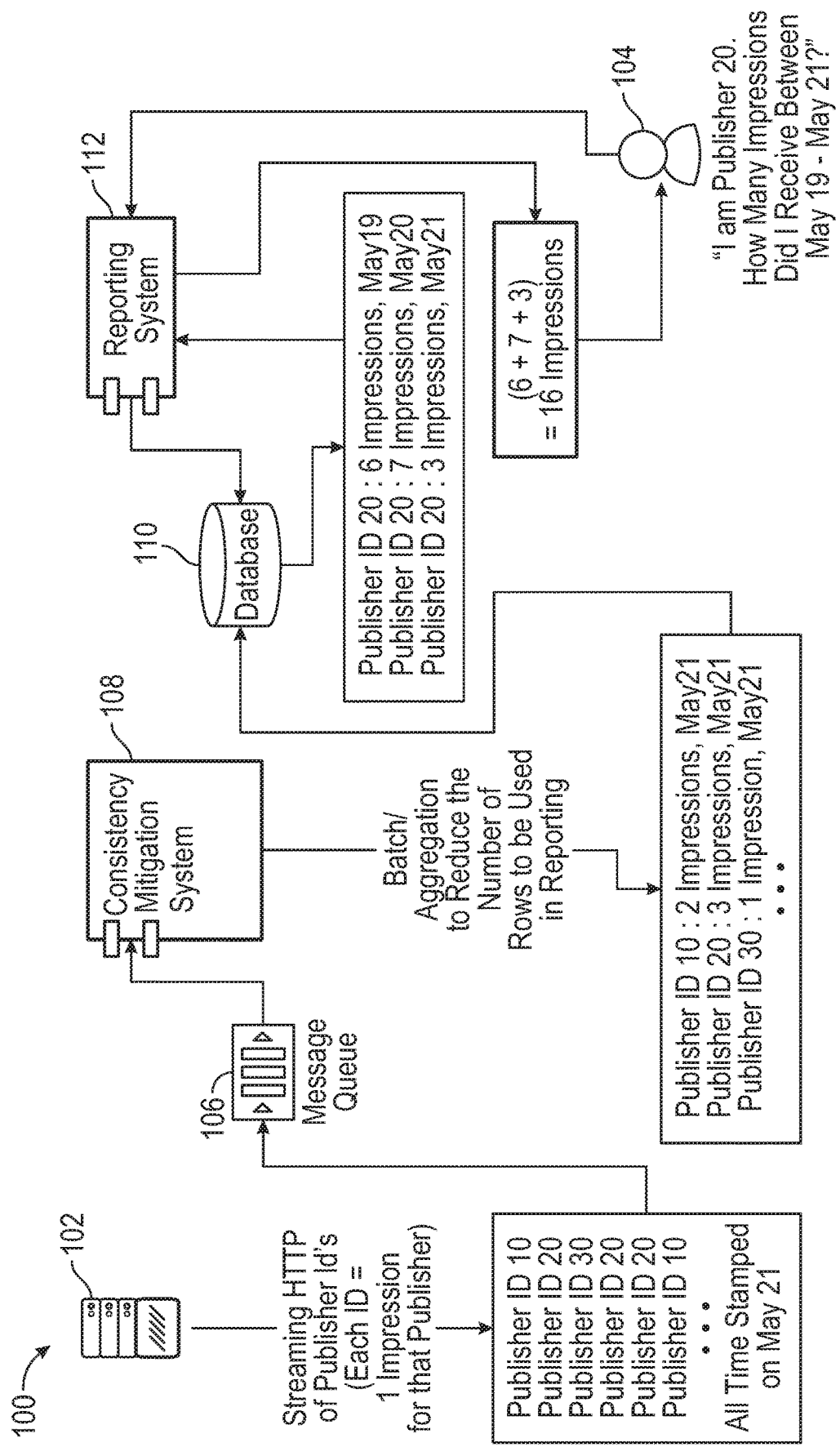
FIG. 1 is a network diagram illustrating a network environment in which a consistency mitigation system may be implemented, according to some example embodiments.

Reference will now be made in detail to specific example embodiments for carrying out the inventive subject matter. Examples of these specific embodiments are illustrated in the accompanying drawings, it will be understood that these examples are not intended to limit the scope of the claims to the illustrated embodiments. On the contrary, they are intended to cover such alternatives, modifications, and equivalents as may be included within the scope of the disclosure In the following description, specific details are set forth in order to provide a thorough understanding of the subject matter. Embodiments may be practiced without some or all of these specific details.

Aspects of the present disclosure include a system and methods for consistency mitigation in real-time data streams. The system and methods employ techniques for handling out-of-order and duplicated events represented by message objects in a message queue, which may find particular application in high-update database write scenarios.

An example of such application is a website hosting company that wishes to inform each website publisher how many people visited their site over a particular time range. In this example, a need exists to create an impression reporting system that is capable of querying a database over a particular time range, so the publisher can track how many impressions were received over that time range. To address this need, a script is injected that makes a Hypertext Transfer Protocol (HTTP) request with the publisher identifier (ID) encoded. In this manner, a continuously streaming source of message objects representing impressions along with publisher IDs are provided to a message queue for subsequent storage in a data store of the impression reporting system. A system that simply stores a single row per impression and then counts all the rows falling within a given time range, would not be sufficiently fast enough for a publisher that receives millions of hits per day.

To address the foregoing technical issue presented in the above example, batches of impressions that belong to the same publisher may be created. To this end and consistent with some embodiments, a consistency mitigation system maintains a counter for each event (e.g., an impression), and the counter is written to the database along with a time range of that counter represented by an oldest and newest event (e.g., oldest and newest impression). Further, by introducing an aggregating application layer before writing to the database, a high-update scenario is created where a same logical row needs to have its counter incremented many times before writing to the database. In addition, because this layer is directly downstream of the message queue and upstream of the database, the aggregating application layer is responsible for mitigating any out-of-order messages and duplicate messages potentially introduced by a message queue.

The consistency mitigation system also employs a unique identifier, referred to as a "snapshot identifier," to introduce a notion of total ordering from the source, which in turn preserves ordering off messages stored in the database. The snapshot ID is attached to event data in a message object (e.g., prior to being added to the message queue). The snapshot ID may be created by a listener component from among a cluster of listener components that monitor HTTP requests published at the source. The snapshot ID includes a combination of: a timestamp; a machine identifier that identifies the particular listener component that generated the snapshot ID; and a sequence counter that is incremented with each new snapshot ID created by the particular listener component. In addition to providing a guaranteed total ordering (per machine basis), the snapshot ID provides a number of other benefits that would be recognized by one of ordinary skill in the art including, for example, partial ordering over a distributed system, extremely fast generation, compactness (e.g., it can fit within standard 64 bits), guaranteed uniqueness, and providing meaningful semantics (e.g., a timestamp and an identifier of the machine that generated the snapshot ID).

With reference to FIG. 1, an example network environment 100 is shown. As shown, a listener component 102 monitors incoming event data from a real-time streaming data source (not shown). The listener component 102 may be one of many such components included in a cluster of listener components configured to monitor incoming event data from one source among multiple sources. The event data represents events such as web page impressions. For each event, the listener component 102 generates a message object that includes a primary key, a snapshot ID, and a message payload that corresponds to the event. In the example presented in FIG. 1, the primary key is a publisher identifier that identifies a website publisher, in particular, publisher 104. As referenced above, the snapshot ID includes a combination of a timestamp; a machine identifier that identifies the listener component 102; and a sequence counter that is incremented with each new snapshot identifier created by the listener component 102.

The listener component 102 passes message objects to a message queue 106, which functions as an intermediary between the real-time streaming data sources and a consistency mitigation system 108. The consistency mitigation system 108 is responsible for batching and aggregating message objects that belong to the same primary key prior to persisting the message objects to a database 110. According to some example embodiments, where possible, the consistency mitigation system 108 does not block itself on accepting new message objects, which creates a pushback effect that will negatively affect upstream processes.

The information persisted to the database 110 by the consistency mitigation system 108 includes a result of the aggregation along with a time range corresponding to the result of the aggregation represented by the oldest and newest impressions. Additionally, the consistency mitigation system 108 is responsible for mitigating any out-of-order messages and duplicate message introduced by the message queue 106. In this example, the batching and aggregating message objects that belong to the same primary key correspond to grouping and counting impressions that belong to the same website publisher. By batching and aggregating the message objects prior to persisting them to the database 110, the consistency mitigation system 108 reduces the number of rows that will be read by a reporting system 112 as part of reporting impressions to the publisher 104. In reporting the impressions to the publisher 104, the reporting system 112 may use the publisher ID of the publisher 104 to query the database 110 over a particular time range, and retrieve the corresponding number of impressions (e.g., the result of the aggregation) therefrom. The reporting system 112 may then provide the number of impressions occurring over the time range to the publisher 104.

Although aspects of the present disclosure may find particular application in impression reporting systems and the particular example presented above involves an impression reporting systems, it shall be appreciated that the inventive subject matter is not limited to application in impression reporting systems. For example, aspects of the present disclosure may also be utilized in aggregating features for machine learning or for managing volume of internet of things (IoT) traffic. Additionally, one of ordinary skill in the art will recognize that any one of the listener component 102, the publisher 104, the message queue 106, the consistency mitigation system 108, the database 110, and the reporting system 112 may be, include, or utilize a machine such as a server or any other type of computing machine. Further details regarding an example of such a machine are described below in reference to FIG. 10, according to some example embodiments.

Figure 2:
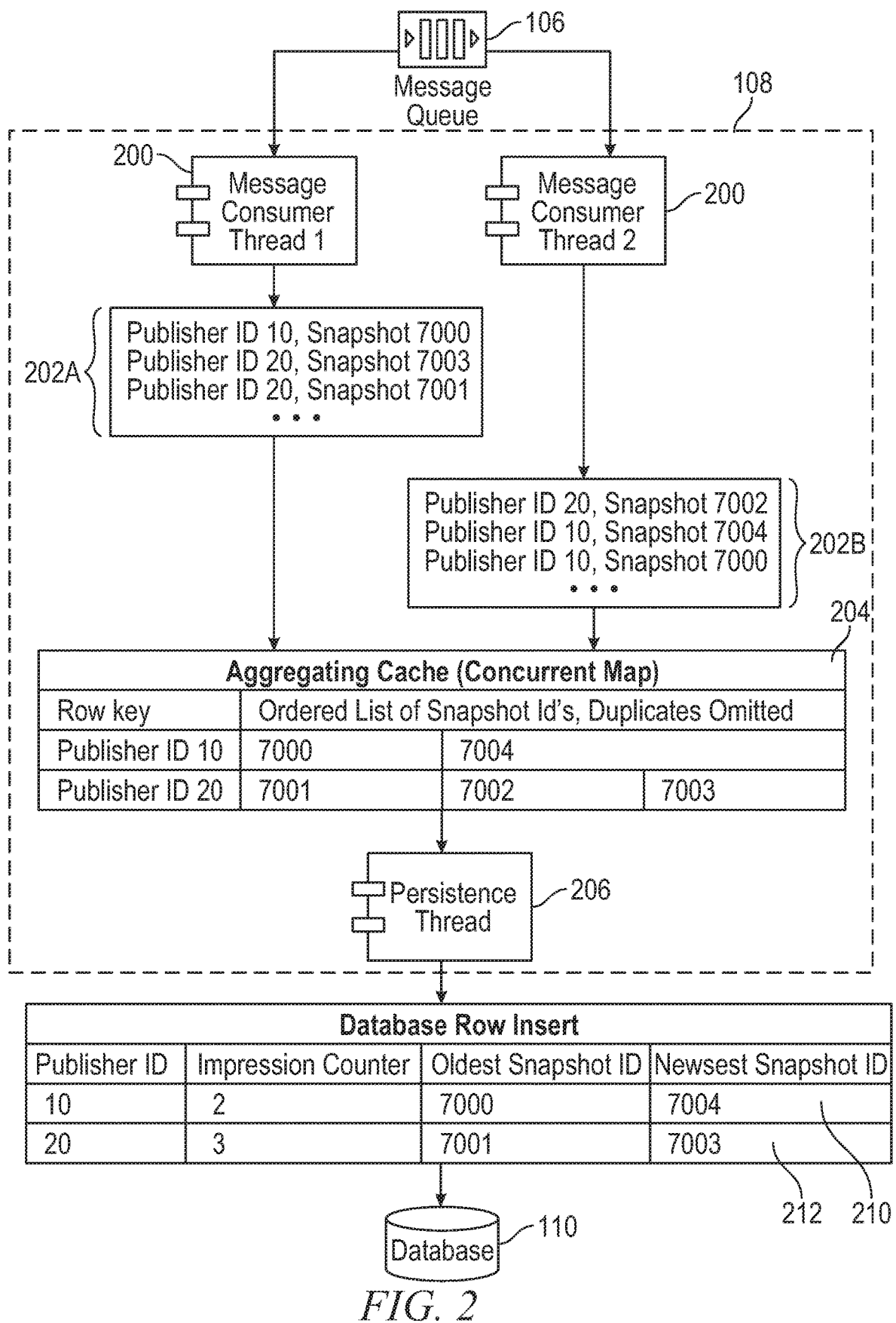
FIG. 2 is a diagram illustrating an architecture of the consistency mitigation system and a flow of information through functional components of the consistency mitigation system, according to some example embodiments.

FIG. 2 is a diagram illustrating an architecture of the consistency mitigation system 108 and a flow of information through the functional components of the consistency mitigation system 108, according to some example embodiments.

Any one or more of the functional components (e.g., threads) illustrated in FIG. 2 and described herein may be implemented using hardware (e.g., a processor of a machine) or a combination of hardware and software. For example, any one of the components described herein may configure a processor to perform the operations described herein for that component. Moreover, any two or more of these components may be combined into a single component, and the functions described herein for a single component may be subdivided among multiple components. Furthermore, according to various example embodiments, any of the functional components illustrated in FIG. 2 may be implemented together or separately within a single machine, database, or device or may be distributed across multiple machines, databases, or devices.

As shown, multiple message consumer threads 200 read messages from the message queue 106. Consistent with some embodiments, the handover of message objects to the message consumer threads 200 may take place on a separate thread context, making thread safety a consideration for the message consumer threads 200. As an example, message objects 202A and 202B may be accessed from the message queue 106 by the multiple message consumer threads 200. Each of the message objects read by the message consumer threads 200 includes a primary key, in this example a publisher ID, and a snapshot ID (e.g. generated by the listener component 102). Duplicate message objects may be received or message objects may be out-of-order, although it is assumed that the message objects have a total ordering as represented by respective snapshot IDs.

As shown, the message consumer threads 200 add the message objects 202A and 202B to an aggregating cache 204. The aggregating cache 204 is a thread-safe concurrent map of the primary key (e.g., publisher ID) to an ordered list of snapshot IDs. In adding message objects 202A and 202B to the aggregating cache 204, the message consumer threads 200 ignore duplicate snapshot IDs.

A persistence thread 206 is responsible for persisting message objects (e.g., 202A and 202B) using a work batch of message objects from the aggregating cache 204 to the database 110. The persistence thread 206 is further responsible for performing aggregation of the message objects. The message consumer threads 200 are responsible for handling subsequent clearing of persisted message objects from the aggregating cache 204. In persisting the message objects mapped to a particular primary key to the database 110, the persistence thread 206 writes a row to the database 110 that includes the primary key (e.g., publisher ID), a result of the aggregation (e.g., impression counter), and the oldest and newest snapshot IDs corresponding to the result of the aggregation. The oldest and newest snapshot IDs corresponding to the result of the aggregation collectively represent the time range for the result of the aggregation. Further details regarding the functional components of the consistency mitigation system 108 are discussed below in reference to FIGS. 4-9.

Figure 3:
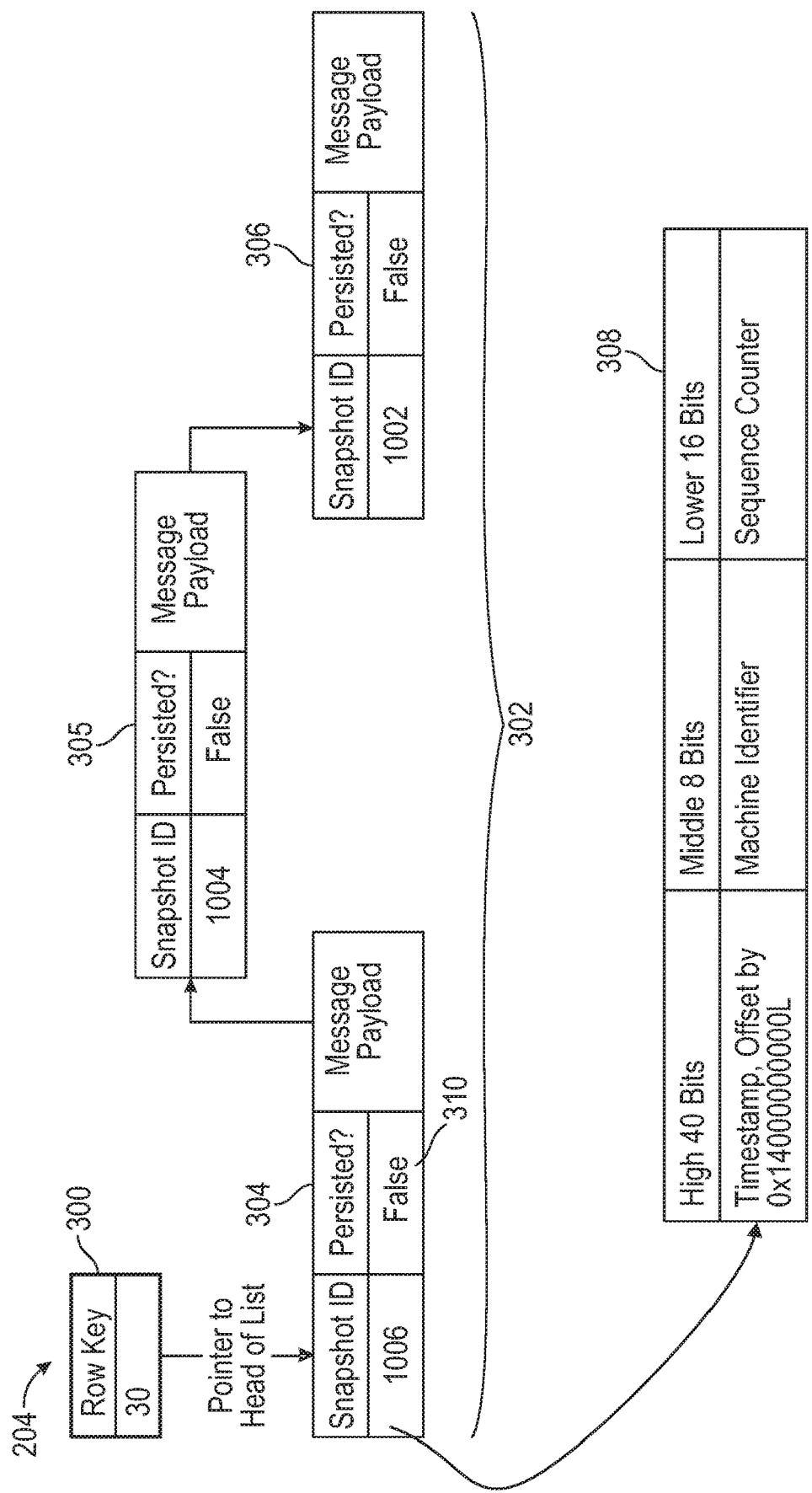
FIG. 3 is a diagram illustrating an example structure of an aggregating cache utilized by the consistency mitigation system, according to some example embodiments.

FIG. 3 is a diagram illustrating an example structure of the aggregating cache 204, according to some example embodiments. The aggregating cache 204 is a data structure that one of ordinary skill in the art may recognize as a concurrent map. As shown, the aggregating cache 204 includes a mapping of a primary key 300 to a linked list 302 of message objects 304-306 accessed from the message queue 106. A linked list is an ordered set of data elements, each containing a link (e.g., a pointer) to its successor. In the linked list 302, the data elements are the message objects 304-306, and each message object may be referred to as an "entry" in the linked list 302. Further, the message objects 304-306 are ordered chronologically from newest to oldest based on respective snapshot IDs of the message objects 304-306.

Each entry (e.g., message objects 304-306) included in the linked list 302 includes a snapshot ID (e.g., a snapshot ID 308) and a volatile Boolean flag to mark (e.g., a persistence flag 310) a persistence state of the corresponding entry (e.g., whether the message object has been persisted to the database 110). The consistency mitigation system 108 includes underlying logic that assumes that if a message object is marked as having been persisted, then all older message objects have been persisted as well. Although in the example presented in FIG. 3 the aggregating cache 204 is shown as including only a single linked list, it shall be appreciated that the aggregating cache 204 may include a plurality of linked lists with each linked list corresponding to a different primary key.

Also shown in FIG. 3 is an example format of the snapshot ID 308. As shown, the snapshot ID 308 is 64 bits. In the 64-bit snapshot ID 308, the high 40 bits are allocated for a timestamp (e.g., corresponding to a time in which the event occurred) with an offset (e.g., 0x14000000000L), the middle 8 bits are allocated to the machine identifier that identifies the listener component (e.g., listener component 102) that generated the snapshot ID 308, and the lower 16 bits are allocated to the sequence counter, which is incremented by the identifier listener component with each new snapshot ID that is generated.

Figure 4:
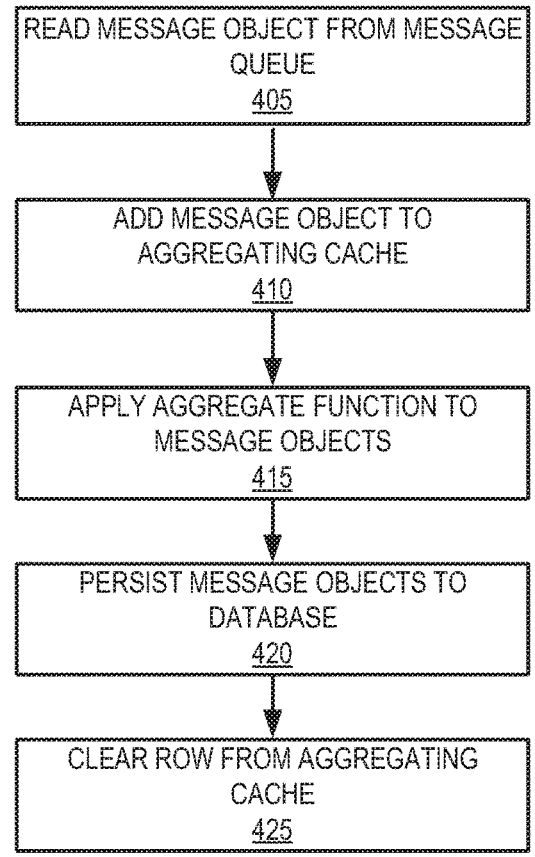
FIGS. 4 and 5 are flow charts illustrating operations of the consistency mitigation system in performing a method for consistency mitigation in real-time streams, according to some example embodiments.

FIG. 4 is a flow chart illustrating operations of the consistency mitigation system in performing a method 400 for consistency mitigation in real-time streams, according to some example embodiments. The method 400 may be embodied in computer-readable instructions for execution by one or more processors such that the operations of the method 400 may be performed in part or in whole by the consistency mitigation system 108; accordingly, the method 400 is described below by way of example with reference thereto. However, it shall be appreciated that at least some of the operations of the method 400 may be deployed on various other hardware configurations, and the method 400 is not intended to be limited to the consistency mitigation system 108.

At operation 405, one of the message consumer threads 200 reads a message object (e.g., 202A and 202B) from the message queue 106. The message object may be generated by the listener component 102 that monitors event data from a real-time streaming data source. The event data represents an event such as a website impression. The message object includes a primary key and a snapshot ID that includes a combination of a timestamp for the event; a machine identifier that identifies the listener component 102 that generated the message object; and a sequence counter maintained by the listener component 102 that is incremented with each new message object generated by the listener component 102. In an example, the primary key is an identifier of a website publisher and the event is a website impression. Consistent with some embodiments, the handover of message objects to the message consumer threads 200 may take place on a separate thread context.

At operation 410, the message consumer thread 200 adds the message object to the aggregating cache 204. As noted above, the aggregating cache 204 includes a mapping of a primary key to a linked list of message objects (e.g., 304-306) ordered based on respective snapshot IDs. Accordingly, the message consumer thread 200 adds the message object to the aggregating cache 204 by inserting the message object into the linked list corresponding to the primary key of the message object. The message consumer thread 200 inserts the message object into the linked list at a location based on the snapshot ID of the message object. In instances in which the message object is the newest message object for the primary key or where no other message objects for the primary key have been added to the aggregating cache 204, the message consumer thread 200 inserts the message object as a head entry of the linked list. In instances in which the message object is not the newest message object in the linked list, the message consumer threads 200 inserts the message object into the linked list in accordance with an ordering based on the snapshot ID of the message object and respective snapshot IDs of the other message objects in the linked list.

At operation 415, the persistence thread 206 applies an aggregate function to the message objects of the linked list. The application of the aggregate function to the message objects of the linked list includes grouping values associated with the message objects together as input based on certain criteria to produce a measurement having a single value. In the example in which the primary key corresponds to a publisher ID and events represented by the message objects correspond to website impressions, the aggregate function may be a count; thus, the application of the aggregate function to the message objects includes performing a count of impressions for the publisher represented by the message objects in the linked list. In addition to a count function, other examples of the application of the aggregate function may include: determining an average value, determining a maximum value, determining a minimum value, determining a median value, determining a mode, or determining a sum of values.

At operation 420, the persistence thread 206 persists the message objects from the linked list to the database 110. In persisting the message objects to the database 110, the persistence thread 206 writes a row to the database 110 that includes the primary key, a result of the aggregation function, and the snapshot IDs of the newest and oldest message objects from the linked list. Because the snapshot IDs include a timestamp, the newest and oldest message objects from the linked list collectively represent a time range for the result of the aggregation function. Following the example from above, the row written to the database 110 by the persistence thread 206 includes the publisher ID, a count of impressions, and the snapshot IDs of the newest and oldest message objects that collectively represent the time range for the count of impressions for the publisher identified by the publisher ID.

At operation 425, one of the message consumer threads 206 clears (e.g., removes) the persisted message objects from the aggregating cache 204. It shall be appreciated that the clearing of the persisted message objects from the aggregating cache 204 by the message consumer thread 206 does not block additional messages from being added to the aggregating cache 204 by an external thread.

It shall be appreciated that while the operations of the method 400 are described in reference to a single message object being added to a linked list in the aggregating cache 204, the consistency mitigation system 108 may perform the operations of the method 400 for multiple messages from the message queue 106 in parallel. Further, while the operations of the method 400 are described in reference to persisting message objects from only a single linked list corresponding to a single primary key, the aggregating cache 204 may include linked lists for multiple primary keys, and thus, the consistency mitigation system 108 may perform, in parallel, the operations described above for the multiple linked lists that may be in the aggregating cache 204. Additionally, the method 400 may be repeated at routine intervals.

Figure 5:
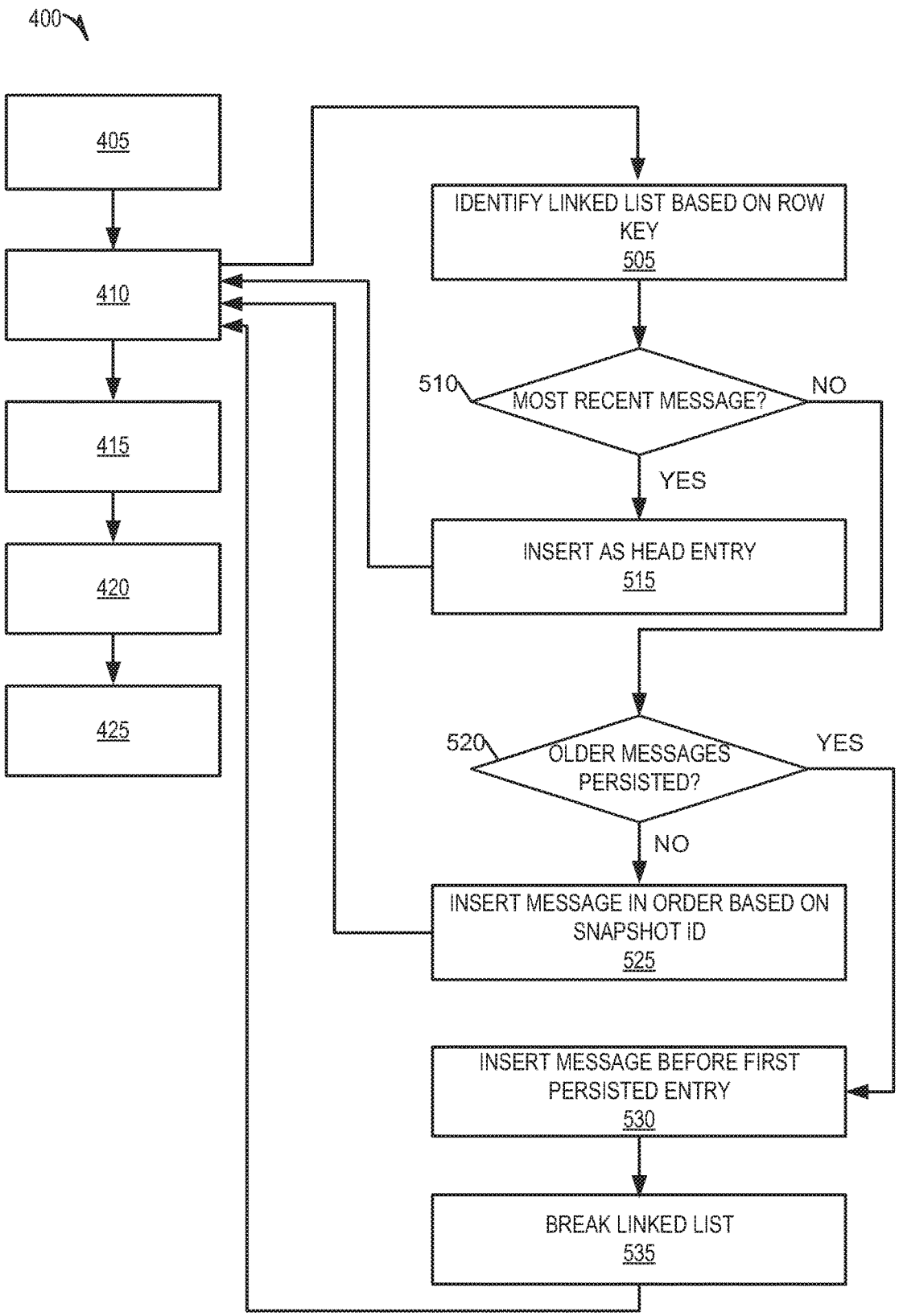

As shown in FIG. 5, the method 400 may include operations 505, 510, 515, 520, 525, 530, and 535. In some example embodiments, operations 505, 510, 515, 520, 525, 530, and 535 included in the method 400 may be performed as part of (e.g., a precursor task, a subroutine, or a portion) operation 410 of the method 400, in which a message consumer thread 200 adds a message object read from the message queue 106 to the aggregating cache 204.

At operation 505, a thread identifies the linked list in the aggregating cache 204 corresponding to the primary key of the message read from the message queue 106. The thread may be from any external threading context such as a dedicated thread responsible for deserializing message objects from the message queue 106. As noted above, the aggregating cache 204 may include a plurality of primary keys, each of which maps to a linked list of corresponding message objects. Thus, the message consumer thread 200 uses the primary key to identify the appropriate linked list for the message object from among a plurality of linked lists included in the aggregating cache 204.

At operation 510, the thread determines whether the message object is the newest message object for the primary key based on a comparison of the snapshot ID of the message object with the snapshot IDs of message objects in the linked list. As an example, the message consumer thread 200 may determine that the message object is the newest message object for the primary key based on the absolute value of the snapshot ID of the message object being greater than all other snapshot IDs included in the linked list.

Figure 6:
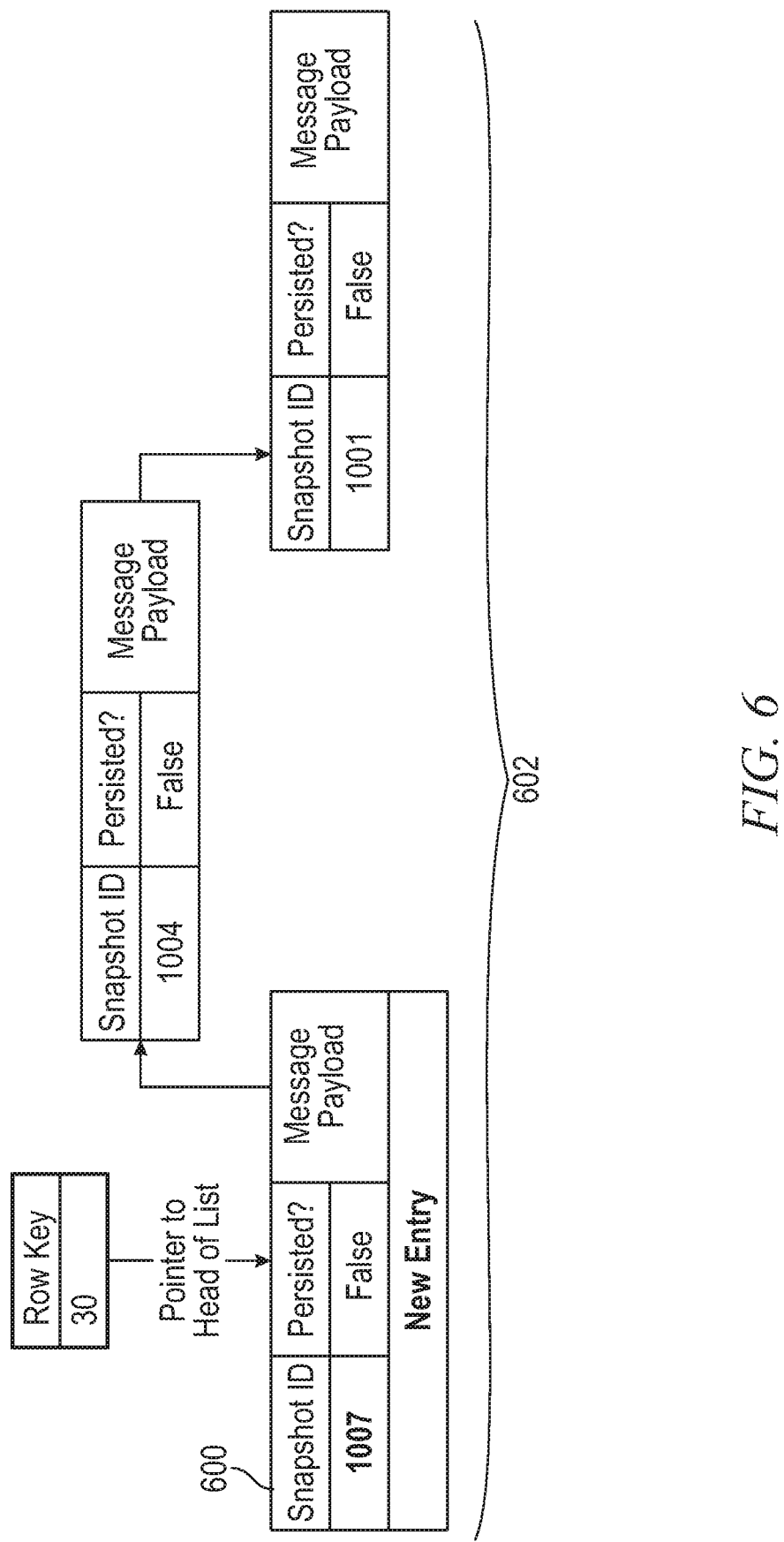
FIGS. 6, 7, 8A, and 8B are diagrams illustrating manners in which message objects are inserted into the aggregating cache in various scenarios, according to some example embodiments.

If, at operation 510, the thread determines that the message object is the newest message object for the primary key, the method 400 proceeds to operation 515 where the thread inserts the message object as the head entry in the linked list, an example of which is illustrated in FIG. 6. With reference to FIG. 6, a message object 600 is inserted as the head entry of the linked list 602 based on a determination that the message object 600 is newer than all other message objects in the linked list 602.

Returning to FIG. 5, if, at operation 515, the thread determines that the message object is not the newest message object for the primary key, the method 400 proceeds to operation 520 where the thread determines whether message objects from the linked list that are older than the message object have been persisted to the database 110. This determination is based on respective persistence flags of the message objects in the linked list.

Figure 7:
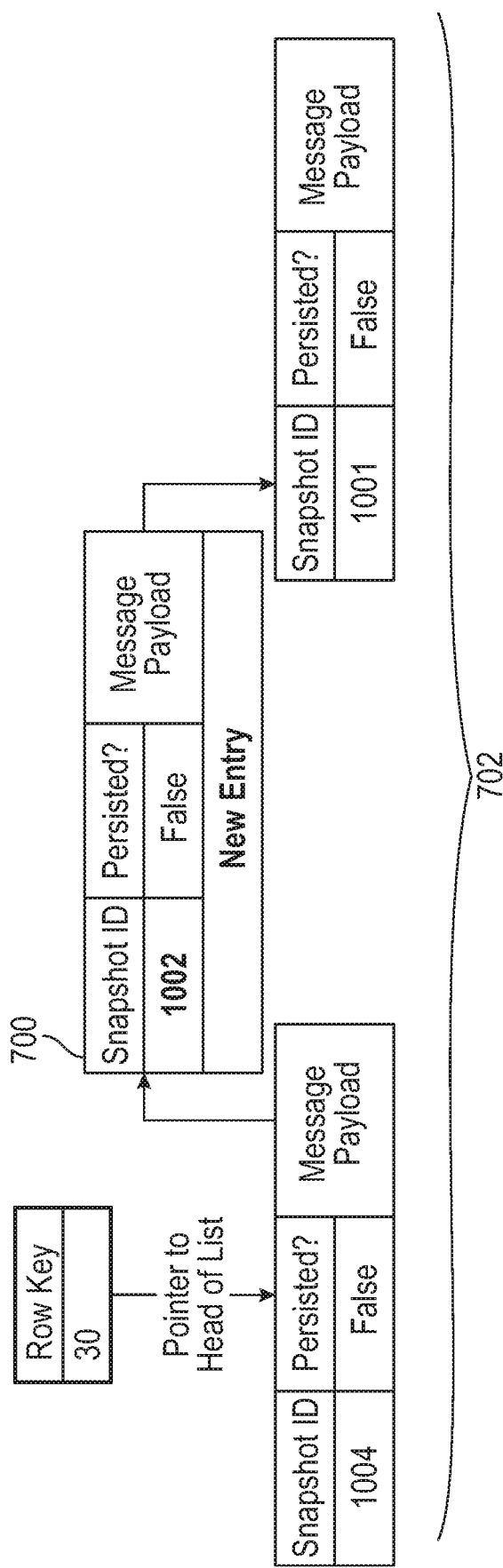

If, at operation 520, the thread determines that no older message objects in the linked list have been persisted to the database 110, the method 400 proceeds to operation 525, where the thread inserts the message object into a position of the linked list in accordance with an ordering based on snapshot IDs. That is, the message object is inserted into the linked list such that the message objects are ordered by snapshot IDs from highest to lowest. An example of operation 525 is illustrated in FIG. 7. With reference to FIG. 7, a message object 700 is inserted into a linked list 702 at a position based on the snapshot ID of the message object 700. In particular, the message object 700 is inserted into the linked list 702 such that the order of snapshot IDs in the linked list 702 is maintained from highest to lowest.

Returning to FIG. 5, if, at operation 520, the thread determines that older message objects in the linked list have been persisted to the database 110, the method 400 proceeds to operation 530, where the thread inserts the message object in the linked list immediately preceding the persisted message object. At operation 535, the thread breaks (e.g., delinks) the linked list at the persisted message object, which results in the inserted message object being the tail entry in the linked list.

Figure 8A:
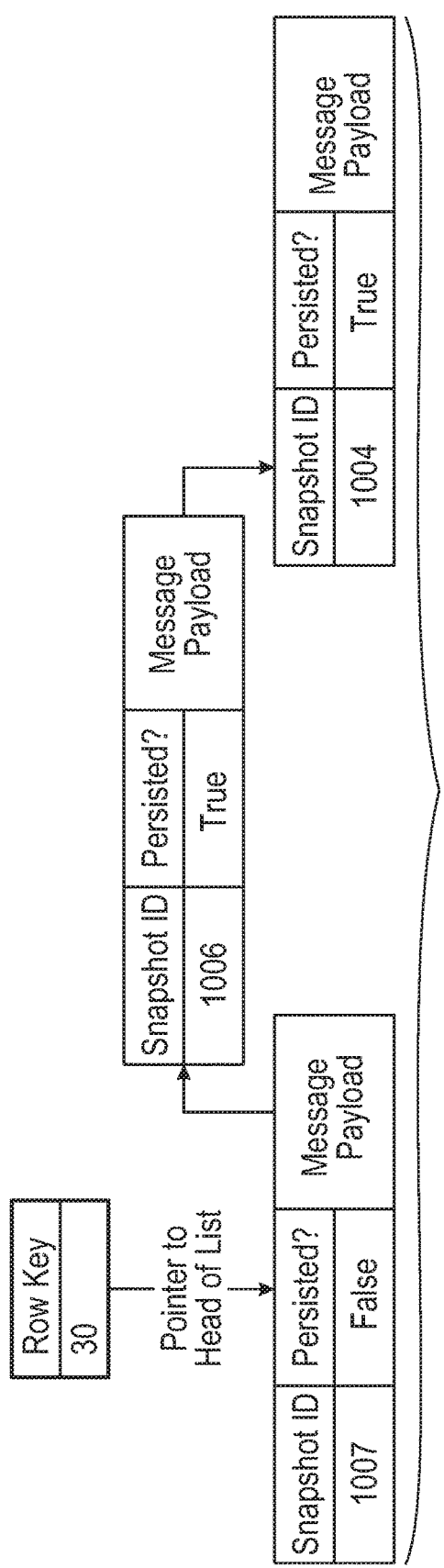
Figure 8B:
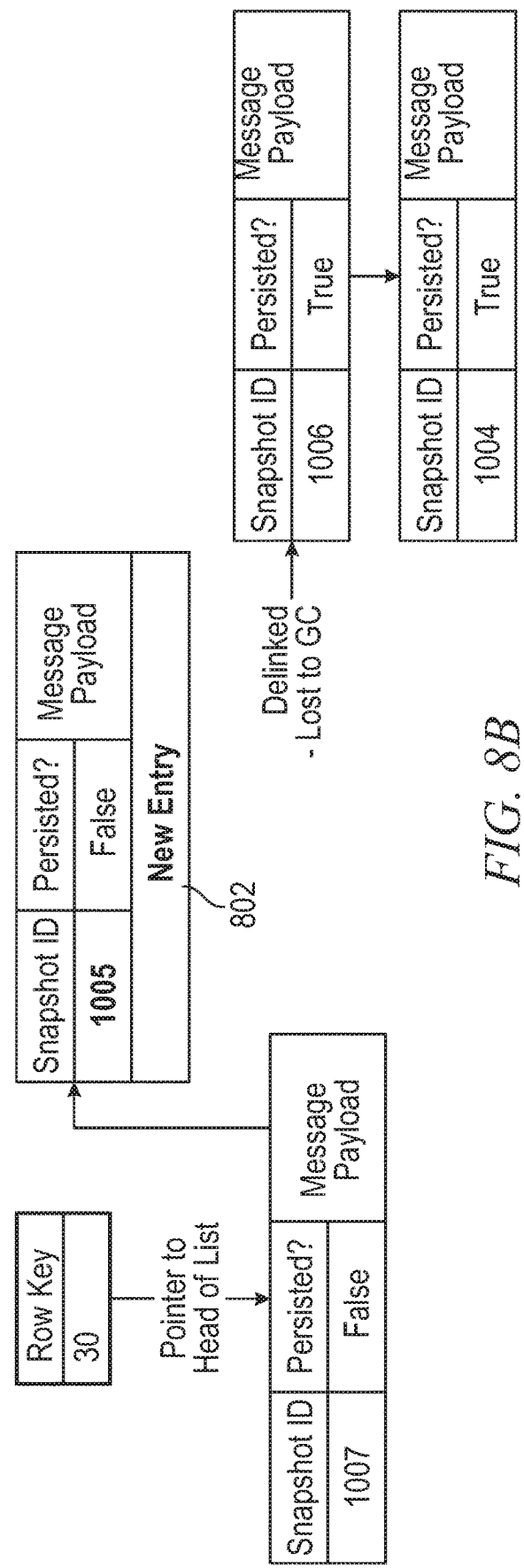

An example of the operations 530 and 535 is illustrated in FIGS. 8A and 8B. With reference to FIG. 8A, a linked list 800 is shown. While the message object in the head entry of the linked list 800 is indicated as not having been persisted by virtue of its persistence flag, the remaining message objects in the linked list 800 are indicated as having been persisted. In FIG. 8B, a new message object 802 is inserted into the linked list 800 in the entry proceeding the first persisted message object in the linked list 800 despite the first persisted message object being newer than the message object 802. Further, the linked list 800 is delinked at the position of the first persisted message object, and in this manner, the new message object 802 becomes the new tail entry of the linked list 800.

Figure 9:
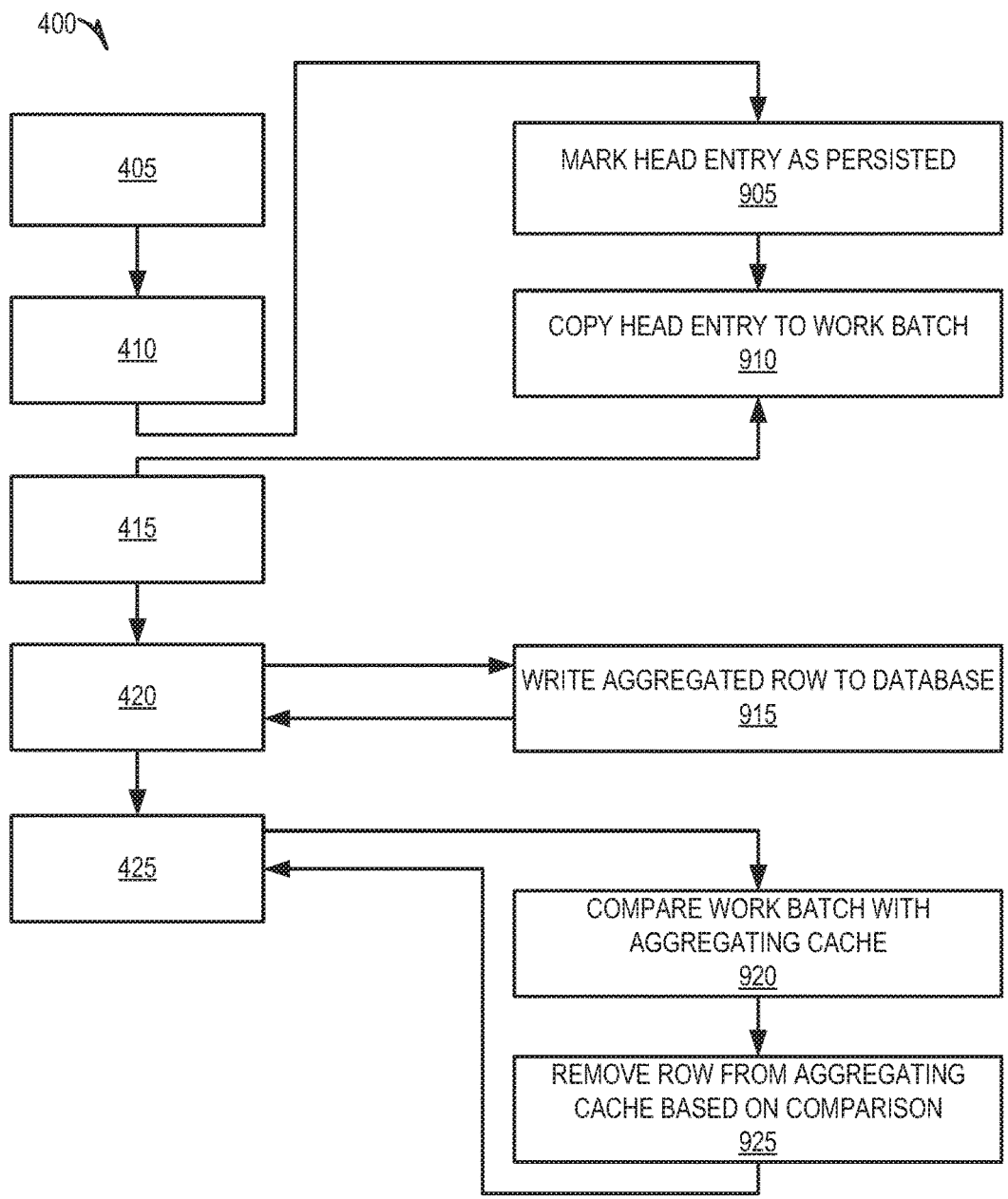
FIG. 9 is a flow chart illustrating additional operations of the consistency mitigation system in performing the method for consistency mitigation in real-time streams, according to some example embodiments.

As shown in FIG. 9, the method 400 may include operations 905, 910, 915, 920, and 925. In some example embodiments, operations 905 and 910 included in the method 400 may be performed prior to (e.g., a precursor task, a subroutine, or a portion) operation 415 of the method 400, in which the persistence thread 206 performs an aggregate function on the message objects from the linked list.

At operation 905, the persistence thread 206 marks the head entry (e.g., the newest message object) in the linked list as persisted. The persistence thread 206 may mark the head entry as persisted by changing the persistence flag from "false" to "true." Subsequent entries in the linked list may not be marked as persisted because the logic employed by the consistency mitigation system 108 assume that entries that are subsequent to a persisted entry have also been persisted.

At operation 910, the persistence thread 206 copies the head entry in the linked list to a work batch. The work batch is a data structure to temporarily store entries (e.g., message objects) as entries are being persisted to the database 110.

In some embodiments, the operation 915 may be performed as part of (e.g., a precursor task, a subroutine, or a portion) operation 420 of the method 400, in which the persistence thread 206 persists the message objects to the database 110.

At operation 915, the persistence thread 206 writes an aggregated row to the database 110 to persist the message objects of the linked list. The aggregated row includes the primary key (e.g., publisher ID), a result of the aggregation performed at operation 415 (e.g., a count of impressions), and the snapshot IDs of the newest and oldest message objects for the primary key, which collectively represent the time range for the aggregation result.

In some embodiments, operations 920 and 925 included in the method 400 may be performed prior to (e.g., a precursor task, a subroutine, or a portion) operation 425 of the method 400, in which the persistence thread 206 clears the message objects from the aggregating cache 204.

At operation 920, the persistence thread 206 compares entries in the work batch to entries in the aggregating cache 204. At operation 925, the persistence thread 206 removes the message objects persisted to the database 110 from the aggregating cache 204 based on the comparison of the entries in the work batch to the entries in the aggregating cache 204.

As noted above, the aggregating cache 204 may include a plurality of linked lists, each of which is mapped to a different primary key. Accordingly, although the operations 905, 910, 915, 920, and 925 are discussed above in reference to a single linked list, it shall be appreciated that operations 905, 910, 915, 920, and 925 may be repeated for each linked list in the aggregating cache 204. In other words, at operation 905, persistence thread 206 marks the head entry for each linked list as persisted, at operation 910, the persistence thread 206 copies each head entry to the work batch; at operation 915, the persistence thread 206 writes an aggregated row to the database 110 for each primary key mapped to a linked list in the aggregating cache 204; at operation 920, the persistence thread 206 compares entries in the work batch to entries in the aggregating cache 204; and at operation 925, one of the message consumer threads 200 removes all persisted objects (across multiple linked lists) from the aggregating cache 204 based on a result of the comparison at operation 920.

Additionally, it shall be appreciated that in operations 905, 910, 915, 920, and 925, no lengthy lock is being held during the database write or removal process. Synchronization blocks are on a per-row basis, and in this manner, the process of setting the persistence state and copying over to the working batch are performed concurrently. These specific techniques, along with the other techniques described in this disclosure, may provide a number of improvements when compared to conventional systems. For example, conventional systems may require locks during database write and map clean-up processes that cause a backlog, which has a negative upward effect that may result in delays during the consumption of messages. Further, conventional systems fail to achieve balance between the contention of receiving elements and serving requests to consume the streaming map. As a result, in high-traffic situations, requests do not execute at the time they are configured to do so, and the map may grow beyond RAM limits.

EXAMPLES

Example 1 is a system comprising: one or more processors of a machine; and a machine-readable storage medium storing a set of instructions that, when executed by the one or more processors, cause the machine to perform operations comprising: reading, from a message queue, a message object having a snapshot identifier that includes a combination of a timestamp and a sequence counter, adding the message object to an aggregating cache, the aggregating cache comprising a linked list of message objects ordered based on respective snapshot identifiers, the adding of the message object to the aggregating cache including inserting the message object into the linked list; applying an aggregating function to the message objects in the linked list, the applying of the aggregating function to the message objects yielding aggregated message objects; persisting the aggregated message objects to a database, the persisting of the aggregated message objects to the database including writing a row to the database, the row including a result of the aggregating function; and clearing the message objects from the aggregating cache in response to the message objects being persisted to the database.

In example 2, the adding of the message object to the aggregating cache of example 1 can optionally include: determining whether the message object is a most recent message object in the linked list of message objects based on the snapshot identifier; and in response to determining that the message object is the most recent message object in the linked list of message objects, inserting the message object as a head entry in the linked list of message objects.

In example 3, the adding of the message object to the aggregating cache of example 1 can optionally include: determining whether the message object is a most recent message object in the linked list of message objects based on the snapshot identifier; and in response to determining that the message object is not the most recent message object in the linked list of message objects, determining whether older message objects in the linked list of message objects have been persisted to the database.

In example 4, the adding of the message object to the aggregating cache of example 3 can optionally include: inserting the message object into the linked list in an order based on the snapshot identifier in response to determining that the older message objects in the linked list of message objects have not been persisted to the database.

In example 5, the adding of the message object of example 3 can optionally include: in response to determining that an older message object in the linked list of message objects has been persisted to the database: breaking the linked list at the older message object; and inserting the message object into the linked list in an order based on the snapshot identifier.

In example 6, each message object in the linked list of examples 1-5 may optionally include an indicator of persistence state; and in examples 1 and 2-5 the determining whether the older message objects in the linked list of message objects have been persisted to the database may be based on respective indicators of the persistence state of the older message objects.

In example 7, the message object of examples 1-6 can optionally include a primary key; the data structure of examples 1-6 can optionally include a mapping of the primary key to the linked list; and the adding of the message object to the aggregating cache of examples 1-6 can optionally include identifying the linked list from a plurality of linked lists in the aggregating cache based on the mapping of the primary key to the linked list.

In example 8, the aggregating function of examples 1-7 may optionally be selected from a group consisting of an average, a count, a maximum, a median, a minimum, a maximum, a mode, and a sum.

In example, 9, the row of examples 1-8 may optionally include the primary key, a newest snapshot identifier, an oldest snapshot identifier, the newest and oldest snapshot identifiers collectively indicating a time window for the row.

In example 10, operations of examples 1-9 may optionally include: marking a head entry in the linked list as persisted; and copying the head entry to a work batch.

In example 11, the clearing of the message objects from the aggregating cache of examples 1-10 may optionally include: comparing the work batch to the aggregating cache; and removing the message objects from the linked list based on the comparison of the work batch to the aggregating cache.

Example 12 is a method comprising: reading, from a message queue, a message object having a snapshot identifier including a combination of a timestamp and a sequence counter; adding the message object to an aggregating cache, the aggregating cache comprising a data structure that includes a linked list of message objects ordered based on respective snapshot identifiers, the adding of the message object to the aggregating cache including inserting the message object into the linked list; applying, using one or more processors of a machine, an aggregating function to the message objects in the linked list, the applying of the aggregating function to the message objects yielding aggregated message objects; persisting the aggregated message objects to a database, the persisting of the aggregated message objects to the database including writing a row to the database, the row including a result of the aggregating function; and clearing the message objects from the aggregating cache based on the message objects being persisted to the database.

In example 13, the adding of the message object to the aggregating cache of example 1.2 can optionally include: determining whether the message object is a most recent message object in the linked list of message objects based on the snapshot identifier; and in response to determining that the message object is not the most recent message object in the linked list of message objects, determining whether older message objects in the linked list of message objects have been persisted to the database.

In example 14, the adding of the message object to the aggregating cache of example 13 can optionally include: determining whether the message object is a most recent message object in the linked list of message objects based on the snapshot identifier; and in response to determining that the message object is not the most recent message object in the linked list of message objects, determining whether older message objects in the linked list of message objects have been persisted to the database.

In example 15, the adding of the message object to the aggregating cache of example 14 can optionally include: inserting the message object into the linked list in an order based on the snapshot identifier in response to determining that the older message objects in the linked list of message objects have not been persisted to the database.

In example 16, the adding of the message object of example 14 can optionally include: in response to determining that an older message object in the linked list of message objects has been persisted to the database: breaking the linked list at the older message object; and inserting the message object into the linked list in an order based on the snapshot identifier.

In example 17, each message object in the linked list of examples 12-16 may optionally include an indicator of persistence state; and in examples 12 and 13-16 the determining whether the older message objects in the linked list of message objects have been persisted to the database may be based on respective indicators of the persistence state of the older message objects.

In example 18, the message object of examples 12-17 can optionally include a primary key; the data structure of examples 12-17 can optionally include a mapping of the primary key to the linked list; and the adding of the message object to the aggregating cache of examples 12-17 can optionally include identifying the linked list from a plurality of linked lists in the aggregating cache based on the mapping of the primary key to the linked list.

In example 19, the row of examples 12-18 may optionally include the primary key, a newest snapshot identifier, an oldest snapshot identifier, the newest and oldest snapshot identifiers collectively indicating a time window for the row.

Example 20 is a machine-readable storage device embodying instructions that, when executed by a machine, cause the machine to perform operations comprising: reading, from a message queue, a message object having a snapshot identifier including a combination of a timestamp and a sequence counter; adding the message object to an aggregating cache, the aggregating cache comprising a data structure that includes a linked list of message objects ordered based on respective snapshot identifiers, the adding of the message object to the aggregating cache including inserting the message object into the linked list; applying an aggregating function to the message objects in the linked list, the applying of the aggregating function to the message objects yielding aggregated message objects; persisting the aggregated message objects to a database, the persisting of the aggregated message objects to the database including writing a row to the database, the row including a result of the aggregating function; and clearing the message objects from the aggregating cache based on the message objects being persisted to the database.

Machine Architecture

Figure 10:
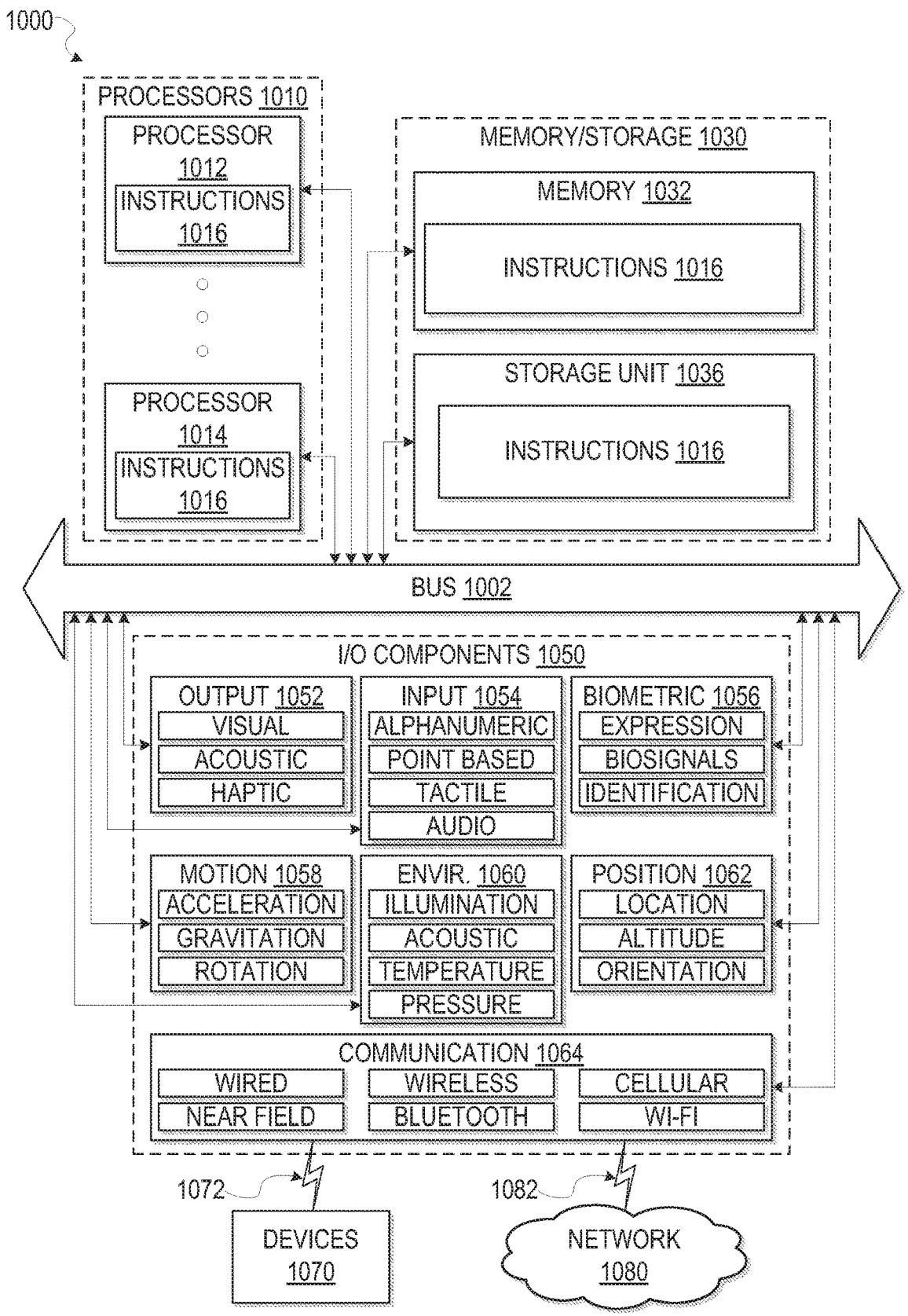
FIG. 10 is a diagrammatic representation of a machine in the example form of a computer system within which a set of instructions for causing the machine to perform any one or more of the methodologies discussed herein may be executed.

FIG. 10 is a block diagram illustrating components of a machine 1000, according to some example embodiments, able to read instructions from a machine-readable medium (e.g., a machine-readable storage device) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may include executable code that causes the machine 1000 to execute the method 400. These instructions transform the general, non-programmed machine into a particular machine (e.g., the consistency mitigation system 108) programmed to carry out the described and illustrated methodologies in the manner described herein. The machine 1000 may operate as a standalone device or may be coupled (e.g., networked) to other machines In a networked deployment, the machine 1000 may operate in the capacity of a server machine or a client machine in a server-client network environment, or as a peer machine in a peer-to-peer (or distributed) network environment. By way of non-limiting example, the machine 1000 may comprise or correspond to a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory/storage 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include a multi-core processor 1010 that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core processor), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of the processors 1010 are examples of machine-readable media.

As used herein, "machine-readable medium" means a device able to store instructions and data temporarily or permanently, and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine (e.g., processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se. The "machine-readable medium" may also be referred to as a "machine-readable storage device" or "hardware storage device."

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), acoustic sensor components (e.g., one or more microphones that detect background noise), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072 respectively. For example, the communication components 1064 may include a network interface component or other suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix. Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1080 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (40) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between or among such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Language

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
one or more processors of a machine; and
a machine-readable storage medium storing a set of instructions that, when executed by the one or more processors, cause the machine to perform operations comprising:
reading, from a message queue, a message object having a snapshot identifier that includes a combination of a timestamp and a sequence counter;
adding the message object to an aggregating cache, the aggregating cache comprising a linked list of message objects ordered based on respective snapshot identifiers, the adding of the message object to the aggregating cache including inserting the message object into the linked list;
applying an aggregating function to the message objects in the linked list, the applying of the aggregating function to the message objects yielding aggregated message objects;
persisting the aggregated message objects to a database, the persisting of the aggregated message objects to the database including writing a row to the database, the row including a result of the aggregating function; and
clearing the message objects from the aggregating cache in response to the message objects being persisted to the database.

2. The system of claim 1, wherein the adding of the message object to the aggregating cache further comprises:
determining whether the message object is a most recent message object in the linked list of message objects based on the snapshot identifier; and
in response to determining that the message object is the most recent message object in the linked list of message objects, inserting the message object as a head entry in the linked list of message objects.

3. The system of claim 1, wherein the adding of the message object to the aggregating cache further comprises:
determining whether the message object is a most recent message object in the linked list of message objects based on the snapshot identifier; and
in response to determining that the message object is not the most recent message object in the linked list of message objects, determining whether older message objects in the linked list of message objects have been persisted to the database.

4. The system of claim 3, wherein the adding of the message object to the aggregating cache further comprises inserting the message object into the linked list in an order based on the snapshot identifier in response to determining that the older message objects in the linked list of message objects have not been persisted to the database.

5. The system of claim 3, wherein the adding of the message object to the aggregating cache further comprises:
in response to determining that an older message object in the linked list of message objects has been persisted to the database:
breaking the linked list at the older message object; and
inserting the message object into the linked list in an order based on the snapshot identifier.

6. The system of claim 3, wherein:
each message object in the linked list includes an indicator of persistence state; and
the determining whether the older message objects in the linked list of message objects have been persisted to the database is based on respective indicators of the persistence state of the older message objects.

7. The system of claim 1, wherein:
the message object further includes a primary key;
the data structure includes a mapping of the primary key to the linked list; and
the adding of the message object to the aggregating cache comprises identifying the linked list from a plurality of linked lists in the aggregating cache based on the mapping of the primary key to the linked list.

8. The system of claim 1, wherein the aggregating function is selected from a group consisting of: an average, a count, a maximum, a median, a minimum, a maximum, a mode, and a sum.

9. The system of claim 1, wherein the row further includes the primary key, a newest snapshot identifier, an oldest snapshot identifier, the newest and oldest snapshot identifiers collectively indicating a time window for the row.

10. The system of claim 1, wherein the operations further comprise:
marking a head entry in the linked list as persisted; and
copying the head entry to a work batch.

11. The system of claim 10, wherein the clearing of the message objects from the aggregating cache comprises:
comparing the work batch to the aggregating cache; and
removing the message objects from the linked list based on the comparison of the work batch to the aggregating cache.

12. A method comprising:
reading, from a message queue, a message object having a snapshot identifier including a combination of a timestamp and a sequence counter;
adding the message object to an aggregating cache, the aggregating cache comprising a data structure that includes a linked list of message objects ordered based on respective snapshot identifiers, the adding of the message object to the aggregating cache including inserting the message object into the linked list;
applying, using one or more processors of a machine, an aggregating function to the message objects in the linked list, the applying of the aggregating function to the message objects yielding aggregated message objects;
persisting the aggregated message objects to a database, the persisting of the aggregated message objects to the database including writing a row to the database, the row including a result of the aggregating function; and
clearing the message objects from the aggregating cache based on the message objects being persisted to the database.

13. The method of claim 12, wherein the adding of the message object to the aggregating cache further comprises:
determining whether the message object is a most recent message object in the linked list of message objects based on the snapshot identifier; and
in response to determining that the message object is the most recent message object in the linked list of message objects, inserting the message object as a head entry in the linked list of message objects.

14. The method of claim 12, wherein the adding of the message object to the aggregating cache further comprises:
determining whether the message object is a most recent message object in the linked list of message objects based on the snapshot identifier; and in response to determining that the message object is not the most recent message object in the linked list of message objects, determining whether older message objects in the linked list of message objects have been persisted to the database.

15. The method of claim 14, wherein the adding of the message object to the aggregating cache further comprises inserting the message object into the linked list in an order based on the snapshot identifier in response to determining that the older message objects in the linked list of message objects have not been persisted to the database.

16. The method of claim 14, wherein the adding of the message object to the aggregating cache further comprises:
in response to determining that an older message object in the linked list of message objects has been persisted to the database:
breaking the linked list at the older message object; and
inserting the message object into the linked list in an order based on the snapshot identifier.

17. The method of claim 14, wherein:
each message object in the linked list includes an indicator of persistence state; and
the determining whether the older message objects in the linked list of message objects have been persisted to the database is based on respective indicators of the persistence state of the older message objects.

18. The method of claim 12, wherein:
the message object further includes a primary key;
the data structure includes a mapping of the primary key to the linked list; and
the adding of the message object to the aggregating cache comprises identifying the linked list from a plurality of linked lists in the aggregating cache based on the mapping of the primary key to the linked list.

19. The method of claim 12, wherein the row further includes the primary key, a newest snapshot identifier, an oldest snapshot identifier, the newest and oldest snapshot identifier collectively indicating a time window for the row.

20. A machine-readable storage device embodying instructions that, when executed by a machine, cause the machine to perform operations comprising:
reading, from a message queue, a message object having a snapshot identifier including a combination of a timestamp and a sequence counter;
adding the message object to an aggregating cache, the aggregating cache comprising a data structure that includes a linked list of message objects ordered based on respective snapshot identifiers, the adding of the message object to the aggregating cache including inserting the message object into the linked list;
applying an aggregating function to the message objects in the linked list, the applying of the aggregating function to the message objects yielding aggregated message objects;
persisting the aggregated message objects to a database, the persisting of the aggregated message objects to the database including writing a row to the database, the row including a result of the aggregating function; and
clearing the message objects from the aggregating cache based on the message objects being persisted to the database.

* * * * *